United States Patent Office 3,255,093
Patented June 7, 1966

3,255,093
CONVERSION OF GLUCOSE TO 2-KETOGLUCONIC ACID
Thomas D. Nunheimer, Lewisburg, and Thomas Phillips, Edwardsville, Pa., assignors to Merck & Co., Inc., Rahway, N.J., a corporation of New Jersey
No Drawing. Filed Mar. 5, 1964, Ser. No. 349,733
3 Claims. (Cl. 195—47)

This invention relates to an improved process for producing ketohexonic acids by the fermentative oxidation of hexoses.

More particularly, it relates to an improved process for converting glucose to 2-ketogluconic acid.

The acid, 2-ketogluconic acid, is an important intermediate used in the manufacture of isoascorbic acid. This acid is readily prepared by the fermentative oxidation of glucose. In this process a glucose-oxidizing microorganism, such as *Pseudomonas fluorescens*, is cultivated in a medium comprising essentially glucose, nitrogenous material and small amounts of calcium carbonate, and the calcium salt of 2-ketogluconic acid is produced.

The efficiency of such a process is limited by the effectiveness of the selected microorganism in bringing about the conversion of glucose to 2-ketogluconic acid, the allowable concentration of glucose which may be utilized in the fermentation medium as starting material, and by the time required for maximum conversion of glucose to 2-ketogluconic acid to take place. When relatively high concentrations of glucose are employed in the fermentation medium, the fermentation time is lengthened and the conversion efficiency of the microorganism is adversely affected, resulting in a substantially lower yeld of 2-ketogluconic acid.

It has now been found that this fermentative conversion is unexpectedly improved by elimination of calcium carbonate from the fermentation medium and by controlling the pH of the medium by the addition of ammonia during the active growth phase of the microorganism. Thus, it has been found, in accordance with our invention, that high conversion yields of 2-ketogluconic acid are obtained in relatively short periods of time when the pH of media containing relatively high concentrations of glucose is maintained between about 5 and 7 by the addition of ammonia during the active growth phase of the microorganisms. Use of ammonia to control the pH of the fermentation medium eliminates the need for any added calcium carbonate and, at the same time, allows higher initial concentrations of glucose in the fermentation medium. In addition to allowing higher concentrations of glucose, this method of controlling the pH also substantially reduces the time required to bring about conversions of glucose to 2-ketogluconic acid in high yield.

The microorganisms used in carrying out the basic conversion process may be any one of a variety of species of microorganisms such as are disclosed in Bergey's Manual of Determinative Bacteriology, the seventh edition. A large number of organisms of the type which will attack hexoses during the growth phase are found in the group classified by Bergey as the Pseudomonadaceae family. Members of the Pseudomonas genus are known to convert glucose to 2-ketogluconic acid. Representative species of microorganisms of the Pseudomonas which may be utilized in converting glucose to 2-ketogluconic acid in accordance with our process are *Pseudomonas fluorescens, Ps. aeruginosa, Ps. reptilivora, Ps. graveolens, Ps. ovalis, Ps. schuylkilliensis, Ps. putida, Ps. mucidolens, Ps. vendrelli, Ps. fragii* and *Ps. mildenbergii*.

In accordance with one embodiment of our invention, a growing culture of *Pseudomonas fluorescens* is cultivated aerobically in a nutrient medium comprising essentially 20% glucose and about 1–5% corn steep liquor while adding gaseous ammonia below the surface of the nutrient medium to maintain the pH of the nutrient medium at about 5.5.

In a fermentative conversion such as this, the only carbohydrate material added to the fermentation medium is glucose, the starting material for the conversion process. Although other carbohydrate materials might be incorporated into the fermentation medium, their use is avoided since their presence would only complicate the recovery of the 2-ketogluconic acid end product desired.

Although there is no lower limit on the amount of glucose which may be employed in the fermentation medium, it is preferred to use an initial concentration of at least 18% and preferably between about 18% and 22% as the initial concentration of glucose in the fermentation medium. When the initial concentration is about 20% and fermentation is carried out for about 30 to 50 hours, the conversion yield from glucose to 2-ketoglucoic acid ranges between about 90% and 100%. After inoculation of the fermentation medium and substantial growth of the microorganisms have occurred, it is possible to add additional glucose intermittently as growth continues, until up to about 30%, or approximately 300 grams per liter of glucose, has been added, without adversely affecting the conversion yield.

In addition to the glucose which is utilized as the main source of carbohydrate in the medium, suitable amounts of nitrogenous materials also should be present. Such materials include beef extract, hydrolyzed soybean meal, hydrolyzed casein, soybean meal, fish meal, brewers' yeast, hydrolyzed corn and wheat glutens, urea, nitrates, ammonium salts, distillers' solubles and corn steep liquor, the corn steep liquor being the preferred nitrogen source in the present microbiological conversion. These nitrogenous materials, in their usual commercial form, are not obtained in a very high degree of purity but this is not harmful to the fermentation. On the other hand, these crude materials often contain traces of growth factors and mineral nutrients which are suitable for use in such microbiological conversions.

The ammonia can be added to the fermentation medium either intermittently or continuously during the period of active microbiological growth which produces 2-ketogluconic acid. After the initial growth phase, during which time the pH of the medium spontaneously drops from about 6.5 to about 5.5, addition of ammonia is begun at a rate such that the pH of the medium is maintained between about 5 and 7 and preferably as close to 5.5 as is practicable, i.e., between about 5.2 and 5.8.

The ammonia may be introduced into the fermentation in any convenient manner. Thus, ammonia gas, liquid ammonia or a solution of the gas in water may be employed. From a practical standpoint, it is preferable to use gaseous ammonia, which can be bubbled into the fermentation medium below the surface where it is readily dispersed throughout the medium.

Following the completion of the fermentation of glucose to 2-ketogluconic acid in accordance with our invention, the product 2-ketogluconic acid is present in the fermentation broth as the ammonium salt. The product is conveniently recovered by filtration of the fermentation broth to remove the mycelia and other extraneous matter, leaving the ammonium 2-ketogluconate as an aqueous solution in the filtrate. The entire filtrate is then passed through a column of a cation-type polystyrene sulfonic acid ion exchange resin such as "Amberlite IR–120" in acid form to convert ammonium 2-ketogluconate to 2-ketogluconic acid. The effluent of the ion exchange column thus contains an aqueous solution of substantially pure 2-ketogluconic acid. The solution is concentrated under reduced pressure to a specific gravity of about 1.3, in which form the 2-ketogluconic acid may be used without further purification.

The following examples are presented to illustrate methods of carrying out the present invention.

*Example 1*

Approximately 80 gallons of an aqueous solution containing 1.75% of a corn steep liquor is adjusted to a pH of about 6.5 and sterilized by heating at 120° C. for 30 minutes. To the resulting sterile solution is added a sterile solution of 184 pounds of glucose to give a total medium volume of about 100 gallons. The sterile medium is then inoculated with approximately 7–10 gallons of a growing culture of *Pseudomonas fluorescens*. Aeration and agitation of the medium at a temperature of 25° C. is begun and continued until fermentation of the glucose is essentially complete. The pH of the medium during the active fermentation stage is maintained between about 5.4 and 5.8 by the addition of gaseous ammonia below the surface of the fermenting medium.

The following table shows the percent of glucose converted to 2-ketogluconic acid, along with the fermentation times, in a series of fermentations carried out as described above.

| Batch | Initial Amount of Glucose, g./liter [1] | Percent Conversion of Glucose to 2-Ketogluconic Acid [2] | Time, hours |
| --- | --- | --- | --- |
| 1 | 216 | 90 | 28 |
| 2 | 202 | 94 | 45 |
| 3 | 200 | 94 | 54 |

[1] Assay by reducing sugar or glucose oxidase assay.
[2] Based on assay by optical rotation assay.

*Example 2*

A series of fermentations are carried out to compare the effect of incorporating calcium carbonate as a constituent of the aqueous fermentation medium with the use of ammonia to control the pH of the fermentation between about 5 and 7. Medium A had the following composition:

Grams per liter of medium
Glucose _____ 180
Corn steep liquor _____ 1.75
Calcium carbonate _____ 54

Medium B had the following composition:

Grams per liter of medium
Glucose _____ 200
Corn steep liquor _____ 1.75

Media having the above compositions are sterilized after pH adjustment to about 6.5. To the resulting sterile medium is added an inoculum of a growing culture of *Pseudomonas fluorescens*. The medium is then aerated at atmospheric pressure and agitated until the glucose is all consumed, as determined by analysis. The yield of the resulting 2-ketogluconic acid is then determined by analysis. A typical series of fermentations gives the following results:

| | Batch No. | Fermentation Time, hours | Percent Conversion Glucose to 2-Ketogluconic Acid |
| --- | --- | --- | --- |
| Media containing calcium carbonate | 16 | 59 | 91 |
| | 14 | 74 | 84 |
| | 13 | 60 | 95 |
| | 12 | 57 | 95 |
| Fermentations using ammonia as the pH | 17 | 38 | 99 |
| | 19 | 49 | 91 |
| | 20 | 48 | 89 |
| | 21 | 42 | 94 |

The above comparative fermentations clearly illustrate that the efficiency of conversion of glucose to 2-ketogluconic acid per unit time is markedly increased when ammonia is used to control the pH of the fermentation medium over the prior art method employing calcium carbonate as a constituent of the fermentation medium.

When concentrations of glucose higher than about 180 grams per liter are employed using calcium carbonate as a constituent of the fermentation medium, the conversion efficiency of the Pseudomonas organism is sharply reduced, resulting in lower yields of 2-ketogluconic acid.

Various changes and modifications of the invention can be made, and to the extent that such variations incorporate the spirit of this invention, they are intended to be included within the scope of the appended claims.

What is claimed is:

1. A microbiological oxidation process for the conversion of glucose to 2-ketogluconic acid, which comprises inoculating a nutrient medium having a glucose concentration of at least 18% by weight and a pH of about 6.5 with a growing culture of a microorganism selected from the Pseudomonas genus and aerating and agitating the inoculated medium while simultaneously maintaining the pH between about 5 and 7 by the addition of ammonia to the nutrient medium during the active growth phase.

2. A microbiological oxidation process for the conversion of glucose to 2-ketogluconic acid, which comprises inoculating a nutrient medium having a glucose concentration of at least 18% by weight and a pH of about 6.5 with a growing culture of *Pseudomonas fluorescens* and aerating and agitating the inoculated meduim while simultaneously maintaining the pH between about 5 and 7 by the addition of ammonia to the nutrient medium during the active growth phase.

3. A microbiological oxidation process for the conversion of glucose to 2-ketogluconic acid in enhanced yield, which comprises cultivating a culture of *Pseudomonas fluorescens* in a nutrient medium comprising essentially 20% glucose by weight and between about 1 to 5% corn steep liquor by weight, and aerating and agitating the fermentation medium and simultaneously maintaining the pH of the fermentation medium between about 5.2 and 5.8 by the addition of gaseous ammonia under the surface of the fermentation medium during the active growth phase.

References Cited by the Examiner

UNITED STATES PATENTS 2,277,716  3/1942  Lockwood et al. _____ 195—47

A. LOUIS MONACELL, *Primary Examiner.*

L. M. SHAPIRO, *Assistant Examiner.*